United States Patent
Valadon (10) Patent No.: US 9,037,187 B2
(45) Date of Patent: May 19, 2015

(54) INTERFERENCE CANCELLATION RECEIVER AND METHOD

(75) Inventor: Cyril Gregoire Fabrice Valadon, Letch-worth (GB)

(73) Assignee: MStar Semiconductor, Inc., Grand Cayman (KY)

( * ) Notice: Subject to any disclaimer, the term of this patent is extended or adjusted under 35 U.S.C. 154(b) by 1246 days.

(21) Appl. No.: 12/373,978

(22) PCT Filed: Aug. 20, 2007

(86) PCT No.: PCT/GB2007/050499
§ 371 (c)(1),
(2), (4) Date: Jan. 15, 2009

(87) PCT Pub. No.: WO2008/023201
PCT Pub. Date: Feb. 28, 2008

(65) Prior Publication Data
US 2010/0016012 A1    Jan. 21, 2010

(30) Foreign Application Priority Data

Aug. 24, 2006  (EP) ..................... 06119466

(51) Int. Cl.
*H04M 1/00* (2006.01)
*H04L 25/03* (2006.01)
*H04L 25/02* (2006.01)

(52) U.S. Cl.
CPC ....... *H04L 25/03292* (2013.01); *H04L 25/0212* (2013.01); *H04L 25/0328* (2013.01)

(58) Field of Classification Search
USPC ........................................ 375/341; 455/550.1
See application file for complete search history.

(56) References Cited

U.S. PATENT DOCUMENTS 5,533,067 A    7/1996   Jamal et al.

FOREIGN PATENT DOCUMENTS

WO    01/78338 A    10/2001

OTHER PUBLICATIONS

Wubben, D. et al., "Impulse Shortening and Equalization of Frequency-Selective MIMO Channels with Respect to Layered Space-Time Architectures," Signal Processing, Amsterdam, NL, vol. 83, No. 8, Aug. 2003, XP004433469, pp. 1643-1659.
Arslan, H. et al., "Channel Estimation in Narrowband Wireless Communication Systems," Wireless Communications and Mobile Computing, vol. 1, No. 2, Apr. 2001, XP002408961, pp. 201-219.

*Primary Examiner* — Junpeng Chen
(74) *Attorney, Agent, or Firm* — Edell, Shapiro & Finnan, LLC (57) ABSTRACT

A method of receiving a signal formed from information bits propagated through a channel, which has been subjected to interference, the method comprising the steps of: (a) filtering the received signal $r_n$ with a linear interference cancellation filter using estimated filter coefficients $w_n$ to generate a signal $y_n$; (b) processing the signal $y_n$ in a detection unit using an estimated final impulse response of the channel $B_n$ to generate estimates of the transmitted bits; (c) wherein the filter coefficients $w_n$ are calculated using the separate steps of: (c1) estimating, using the received signal $r_n$, an initial impulse response $c_n$ of the propagation channel; (c2) deriving, using the estimated initial channel impulse response $c_n$ and the received signal $r_n$, the filter coefficients $w_n$.

23 Claims, 2 Drawing Sheets

INTERFERENCE CANCELLATION RECEIVER AND METHOD

BACKGROUND

The present invention relates to an interference cancellation receiver and method. In particular, the present invention relates to an interference cancellation receiver architecture used to estimate coefficients of a linear interference cancellation filter.

In order to efficiently and cost-effectively provide services to a large number of cellular subscribers, it is important that networks are designed and deployed in a manner allowing spectral efficiency to be maximised. This can be achieved by employing frequency re-use techniques where the frequency spectrum is shared between multiple cells. However, the re-use of the same frequency resource leads to an increase in the level of interference generated by users active in the network. In today's heavily loaded cellular networks, capacity is therefore limited by interference rather than by thermal noise.

A number of different techniques have been considered in the past in order to reduce the performance degradation due to interference and increasing the network capacity. Adaptive Multi-Rate (AMR), dynamic power control, discontinuous transmission, dynamic channel allocation and frequency hopping are examples of such techniques. However, most of these techniques require significant upgrades to the network infrastructure.

The two main sources of interference in cellular networks are CCI (Co-Channel Interference) coming from users operating on the same frequency and ACI (Adjacent Channel Interference) that is produced by users transmitting on adjacent carriers. It is possible to mitigate the performance degradation caused by adjacent channel interference through the use of filtering techniques (WO2006/027603). On the other hand, CCI is significantly more difficult to mitigate as it occupies the same spectrum as the signal of interest. When multiple antennas are used at the receiver, it is possible to make use of the spatial diversity in order to mitigate the effect of the CCI ("Improved Spatial-Temporal Equalization for EDGE: A Fast Selective-Direction MMSE Timing Recovery Algorithm and Two-Stage Soft-Output Equalizer", Jack H. Winters, Hanks Zeng, and Ye Li, IEEE Transactions on Communications, December 2001). However, the use of multiple receive antennas is usually not feasible for mobile communication user terminals as the associated cost is too high.

Figure 1:
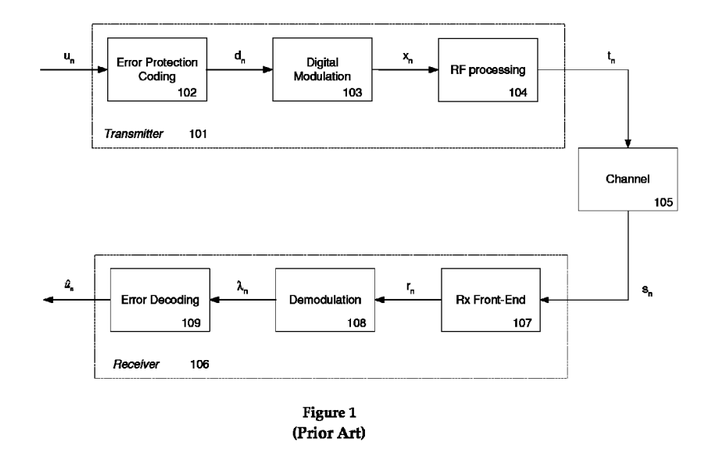
FIG. 1 is schematic of a mobile communication system.

FIG. 1 presents the different processing functions that are typically found in a mobile communication system. The transmitter 101 passes information bits through a block adding error protection coding 102 and then through a digital modulation block 103 which generates a digital complex base-band signal. Conversion to analogue and modulation to the desired carrier frequency is then performed by the RF processing unit 104. As part of the modulation, known symbols may be added to assist with radio channel estimation in the receiver.

Once transmitted, the radio signal then passes through the radio channel 105 before reception at a receiver 106. This radio channel frequently gives rise to Inter-Symbol Interference (ISI) which must then be removed by the receiver to ensure correct reception. Before being processed by the receiver blocks, the signal also acquires both interference and noise. The interference arises from other users of the spectrum whilst the noise is thermal noise from the environment. Additional noise is then added as the signal passes through the Rx front end 107.

The receiver 106 converts the analogue radio signal to a digital base band signal in the Rx front-end 107. The signal is then passed through the demodulation block 108. This serves to estimate the transmitted coded-bits in the presence of the ISI, interference and noise added by the radio channel and the Rx front end. The signal is then decoded 109 to yield the final received information bits.

The demodulation block 108 aims to recover the transmitted information bits from the received base-band signal in the presence of noise of interference. Typically, co-channel and adjacent channel interference is simply modelled as noise. The presence of interference in the communication system leads to an increase in the noise level and therefore degrades the link-level performance.

Recently, a number of different techniques have been proposed to mitigate the impact of CCI on the demodulation process. Interference cancellation can be achieved using different approaches which be can divided into two main categories. In BIC (Blind Interference Cancellation) techniques, the received signal is processed such that the quality of the desired user information is maximised without explicitly estimating the interfering signals. Examples of receiver architectures using BIC are presented in "Single-Antenna Co-Channel Interference Cancellation for TDMA Cellular Radio Systems", P. A. Hoeher, S. Badri-Hoeher, W. Xu and C. Krakowski, IEEE Transactions on Wireless Communications, Volume 5, Issue 6, June 2006.

JD (Joint Detection) techniques, on the other hand, try and jointly demodulate the signal of interest as well as the main interference signal ("Co-channel Interference Cancellation Receiver for TDMA Mobile Systems", P. A. Ranta, A. Hottinen and Z. C. Honkassalo, Proc. IEEE ICC'95, June 1995). JD techniques are best suited to synchronised networks and in such network configuration offer larger potential capacity gains. However, these techniques require the estimation of the propagation channel for the signal of the interfering user to be cancelled. As a result of this, the performance of JD techniques is sensitive to the relative timing of the wanted and interfering signals and the achievable gains in unsynchronised networks is reduced.

The complexity associated with the implementation of JD techniques is also usually very high. This contrasts with BIC techniques which offer a lower implementation complexity and can provide capacity gains in both synchronised and unsynchronised networks. Moreover, since BIC algorithms do not rely on the knowledge of the interfering channel, they can adapt to different and varying interference conditions.

SUMMARY OF THE INVENTION

An object of the present invention is to provide an interference cancellation technique that provides gains in terms of link-level performance and implementation complexity over prior-art solutions.

According to a first aspect of the present invention there is provided a method of receiving a signal formed from information bits propagated through a channel, which has been subjected to interference, the method comprising the steps of:

(a) filtering the received signal $r_n$ with a linear interference cancellation filter using estimated filter coefficients $w_n$ to generate a signal $y_n$;

(b) processing the signal $y_n$ in a detection unit using an estimated final impulse response of the channel $B_n$ to generate estimates of the transmitted bits;

(c) wherein the filter coefficients $w_n$ are calculated using the separate steps of:

(c1) estimating, using the received signal $r_n$, an initial impulse response $c_n$ of the propagation channel;

(c2) deriving, using the estimated initial channel impulse response $c_n$ and the received signal $r_n$, the filter coefficients $w_n$.

The present invention separates the steps of estimating the initial impulse response of the channel and the derivation of the linear interference cancellation filter coefficients. This provides gains over prior art solutions in terms of implementation complexity and link-level performance.

Preferably the method further comprises the step of: (d) estimating, in a separate calculation to the step of calculating the filter coefficients $w_n$, the final impulse response of the channel $B_n$.

The final impulse response of the channel $B_n$ may be estimated by using the estimated channel initial impulse response $c_n$ and the filter coefficients $w_n$. The final impulse response of the channel $B_n$ may be estimated by convolving the initial impulse response $c_n$ with the filter coefficients $w_n$.

Alternatively, the final impulse response of the channel $B_n$ may be estimated directly from the signal $y_n$. A sequence of known modulation symbols $g_n$ may be embedded in the transmitted bits and the step of estimating the final impulse response of the channel uses the known modulation symbols $g_n$.

Preferably the filter coefficients $w_n$ are derived by the steps of:

generating estimated samples of noise $\xi_n$ in the received signal $r_n$ by calculating the difference between received samples and information symbols filtered with the estimated initial channel impulse response $c_n$;

deriving the filter coefficients $w_n$ using the generated noise samples $\xi_n$.

A sequence of known modulation symbols $g_n$ may be embedded in the transmitted bits and the information symbols comprise the known modulation symbols $g_n$.

The information symbols may comprise estimated modulation symbols generated by using a decision-directed technique.

The filter coefficients $w_n$ may be derived from the noise samples $\xi_n$ by using a Least Square (LS) solution.

The filter coefficients $w_n$ may be derived from the noise samples $\xi_n$ by using a Minimum Mean Square Error (MMSE) solution.

The step of estimating the initial impulse response $c_n$ of the propagation channel may also use a sequence of known modulation symbols $g_n$ transmitted with the propagated signal to estimate the initial impulse response $c_n$ of the propagation channel.

The method may further comprise the step of:

comparing characteristics of the noise samples $\xi_n$ against a pre-determined template; and disabling the linear interference cancellation filter based on the result of the comparison.

The step of comparing characteristics of the noise samples $\xi_n$ against a pre-determined template may comprise comparing the power of the noise samples $\xi_n$ against a threshold; and the linear interference cancellation filter is disabled when the power of the noise samples $\xi_n$ is lower than a threshold.

The step of comparing characteristics of the noise samples $\xi_n$ against a pre-determined template may comprise analysing the frequency response of the noise samples $\xi_n$.

The frequency response of the noise samples $\xi_n$ may be used to identify if the main source of noise is thermal noise, in-band band-limited noise or out-of-band noise.

The number of filter coefficients $w_n$ may be determined adaptively based on the power delay profile of the initial channel impulse response $c_n$.

According to a second aspect of the present invention there is provided a receiver for receiving a signal formed from information bits propagated through a channel, which has been subjected to interference, the receiver comprising:

a linear interference cancellation filter arranged to filter the received signal $r_n$ using estimated filter coefficients $w_n$ to generate a signal $y_n$;

a detector arranged to process the signal $y_n$ using an estimated final impulse response of the channel $B_n$ to generate estimates of the transmitted bits;

an initial channel estimation unit arranged to estimate, using the received signal $r_n$, an initial impulse response $c_n$ of the propagation channel;

an interference cancellation filter estimation unit, separate to the initial channel estimation unit, and arranged to derive, using the estimated initial channel impulse response $c_n$ and the received signal $r_n$, the filter coefficients $w_n$.

The receiver may further comprise means for estimating, in a separate calculation to the step of calculating the filter coefficients $w_n$, the final impulse response of the channel $B_n$.

The means for estimating the final impulse response of the channel $B_n$ may be the interference cancellation filter estimation unit, and the interference cancellation filter estimation unit is arranged to estimate the final impulse response of the channel $B_n$ by using the estimated channel initial impulse response $c_n$ and the filter coefficients $w_n$.

The means for estimating the final impulse response of the channel $B_n$ may be a final channel estimation unit arranged to estimate the final impulse response of the channel $B_n$ directly from the signal $y_n$.

There may be provided a cellular telephone handset including a receiver as described above.

The method of the present invention may be realised in hardware, software on a processor or a combination of these.

BRIEF DESCRIPTION OF THE DRAWINGS

Examples of method and receiver according to the invention will now be described with reference to the accompanying drawings, in which.

DETAILED DESCRIPTION

Figure 2:
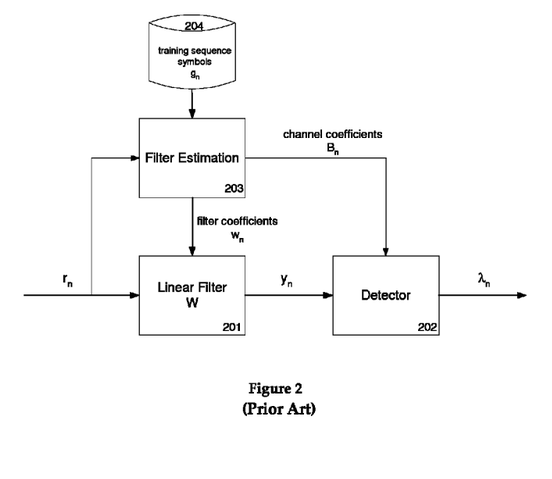
FIG. 2 is a schematic of a prior art receiver.

FIG. 2 presents a prior-art implementation of a BIC receiver (chapter 5.2 in "*Single Antenna Interference Rejection s Means for Increased Capacity in GSM*", M. Olsson, M.Sc. Thesis, February 2002). The complex received samples $r_n$ are first passed through a linear filter 201. The length of the filter is assumed equal to L, and the filter coefficients are denoted as:

$$W = (w_0, w_1, \ldots, w_{L-1})$$

The samples $y_n$ produced by the filter are then processed by the detector 202 in order to generate estimates of the transmitted information bits. A number of different techniques can be used for the detection of the transmitted bits. It is possible to use trellis-based techniques such as the Maximum Likelihood Sequence Estimation (MLSE) approach (section 6.7 in *Digital Communications, 2nd Edition*, J. G. Proakis, McGraw-Hill International).

In order to aid reception and demodulation of the transmitted information, it is typical to embed a sequence of known symbols in the modulated signal. For example, in the GSM system, a sequence of 26 training symbols is inserted in the middle of the transmitted burst (section 5.2.3 in 3GPP TS 05.02; *3rd Generation Partnership Project; Technical Specification Group GSM/EDGE Radio Access Network; Multiplexing and multiple access on the radio path*). This set of known training symbols is used alongside the set of received samples $r_n$ in unit 203 in order to derive the filter coefficients W.

The samples $y_n$ are generated by passing the received samples through the filter W and can therefore be expressed as $$y_n = \sum_{k=0}^{L-1} w_k \times r_{n-k}$$

The samples $y_n$ can also be expressed as a function of the transmitted modulated symbols $x_n$ through the following equation $$y_n = \sum_{k=0}^{M-1} B_k \times x_{n-k} + \gamma_n$$

The term $y_n$ represents noise and interference and is typically modelled as additive white Gaussian noise with zero mean and variance equal to $\sigma^2$. The above equation assumes that the transmission link, including propagation channel and filtering stages, can be represented with a linear model. This assumption is usually valid since the propagation channel can typically be modelled as a varying tap-delay line. It should be noted that for the GMSK modulation used in the GSM system, the pulse shape implemented at the transmitter is applied in the phase domain rather than in the I/Q domain. In such a case, it is still possible to use the above linear model by using a linear approximation to the GMSK modulation ("*Exact and Approximate Construction of Digital Phase Modulations by Superposition of Amplitude Modulated Pulses (AMP)*", P. A. Laurent, *IEEE Transactions on Communications*, 1986). The coefficients $B_k$ for the linear model are not known a-priori at the receiver. Similarly, the length M of the filter, also referred to as channel, is not known by the receiver. In fact, in most conditions, the channel length should be infinite. For practical realisations of the receiver, it is required to limit the length of the linear model. Hence, the length of the filter M is a design decision to be made when implementing the receiver. When trellis-based approaches are used for the detector 202, the length M will determine the number of states for which computations need to be performed.

It is possible to combine the two different expressions for the filtered samples $y_n$ in order to obtain the following equality $$\sum_{k=0}^{L-1} w_k \times r_{n-k} = \sum_{k=0}^{M-1} B_k \times x_{n-k} + \gamma_n$$

This equation can then be re-written as $$w_0 \times r_n = \sum_{k=0}^{M-1} B_k \times x_{n-k} - \sum_{k=1}^{L-1} w_k \times r_{n-k} + \gamma_n$$

It is then assumed that the first filter coefficient $w_0$ is equal to 1. The above equation can then be expressed as $$r_n = \sum_{k=0}^{M-1} B_k \times x_{n-k} - \sum_{k=1}^{L-1} w_k \times r_{n-k} + \gamma_n$$

The above equation is valid for all the received symbols. For example, it can be used for the received symbols corresponding to the transmitted training symbols, when available. The number of received symbols $r_n$ used in the above model is assumed to be equal to N. We can also assume, without any loss of generality, that the length of the channel model M is lower than, or equal to, the length of the filter L. For the set of selected received samples, the above equation can be re-written as $$r_n = \sum_{k=0}^{M-1} B_k \times g_{n-k} - \sum_{k=1}^{L-1} w_k \times r_{n-k} + \gamma_n \text{ for } L-1 \leq n \leq N-1$$

The samples $g_n$ denote transmitted samples $r_n$ which are known by the receiver. These samples can, for example, correspond to training or pilot symbols known to both the transmitter and the receiver. Alternatively, the samples $g_n$ can be generated in a decision-directed manner from the received signal.

The above equation can be written in vector format as follows $$r_n = G_n^T \times B - R_{n-1}^T \times W_1 + \gamma_n$$

In the above equation, B contains the different channel model coefficients $B=(B_0, B_1, \ldots, B_{M-1})^T$. The training symbol and received symbol vectors can be expressed respectively as $G_n=(g_n, g_{n-1}, \ldots, g_{n-M+1})$ and $R_{n-1}=(r_{n-1}, r_{n-2}, \ldots r_{n-L+1})^T$. The array with the interference cancellation filter coefficients is defined as $W_1=(w_1, \ldots, w_{L-1})^T$.

The model for the received signal can then be further simplified to obtain $$r_n = S_n \times F + \gamma_n$$

The vector F of size M+L−1 contains the coefficients for both the interference cancellation filter and the channel model $F=(B^T, W_1^T)^T$. The signal vector $S_n$ is also of size M+L−1 $S_n=(g_n, g_{n-1}, \ldots, g_{n-M+1}, -r_{n-1}, -r_{n-2}, \ldots, -r_{n-L+1})$.

The different equations for $L-1 \leq n \leq N-1$ can then be combined together to obtain the following equation $$R = S \times F + \gamma$$

R is the array containing the N−L+1 received samples $R=(r_{L-1}, r_L, \ldots, r_{N-1})^T$. $\gamma$ is the array containing the different noise samples $\gamma=(\gamma_{L-}, \gamma_L, \ldots, \gamma_{N-1})^T$ and S is a matrix of size N−L+1 by M+L−1 containing the different rows $S_n$. Hence, the contents of the matrix S can be generated from the knowledge of the transmitted training sequence combined with the received symbols.

Using the above model, it is possible to use the Least-Square (LS) algorithm in order to estimate the coefficients of the interference cancellation filter $W_1$ as well as the channel model B $$\tilde{F} = (S^H \times S)^{-1} \times S^H \times R$$

It can be seen that the derivation of the above solution requires the inversion of the square matrix $S^H \times S$ which is of size M+L−1. Hence, the implementation complexity associated with the derivation of the coefficients of the interference cancellation filter increases with the length of the interference cancellation filter as well as with the number of taps in the channel model.

The estimated channel taps $(\tilde{B}_0, \tilde{B}_1, \ldots, \tilde{B}_{M-1})$ can then be used by the detector 202. When trellis-based techniques are used, the estimated channel taps are used to define the different transitions in the trellis.

When a real modulation scheme is used, it is possible to significantly improve the performance of the interference cancellation technique by trying to minimise the level of the noise on the real component only. This is the case for example for the GMSK modulation used in the GSM system (the GMSK modulation is transmitted on both the I and Q components. However, by applying a continuous π/2 phase rotation it is possible to model the GMSK modulation as a purely real modulation). In this case, the training symbols $g_n$ are purely real. The model for the real part of the received training sequence can then be expressed as $$r_n^R = \sum_{k=0}^{M-1} B_k^R \times g_{n-k} - \sum_{k=1}^{L-1} \begin{pmatrix} w_k^R \times r_{n-k}^R - \\ w_k^I \times r_{n-k}^I \end{pmatrix} +$$

$$(w_0^I \times r_n^I) + \gamma_n^R \text{ for } L-1 \le n \le N-1$$

In the derivation of the above equation, it has been assumed, without any loss of generality, that $$w_0 = 1 + jw_0^I$$

The R and I superscripts indicate the selection respectively of the real and imaginary parts of the different signals.

$$r_n = (G_n^T \times B^R) - ((R_{n-1}^R)^T \times W_1^R) + ((R_{n-1}^I)^T \times W_1^I) + \gamma_n$$

The above equation can then be re-written as $$r_n^R = \Gamma_n \times H + \gamma_n^R$$

Where $H = (B_0^R, B_1^R, \ldots, B_{M-1}^R, W_1^R, \ldots, W_L^R, W_0^I, W_1^I, \ldots, W_L^I)^T$ is an array of size M+2L−1 which contains the different filter coefficients. The array $\Gamma_n = (g_n, g_{n-1}, \ldots, g_{n-M+1}, -r_{n-1}^R, \ldots, -r_{n-L}^R, r_{n-1}^I, \ldots, r_{n-L+1}^I)$ contains both received symbols and training symbols.

The different equations for L−1≤n≤N−1 can then be combined to generate the following matrix equation $$R^R = \Gamma \times H + \gamma^R$$

The different filter coefficients can therefore be estimated using the following LS solution $$\tilde{H} = (\Gamma^H \times \Gamma)^{-1} \times \Gamma^H \times R^R$$

It can be seen from the above equation that the derivation of the filter coefficients require the inversion of a matrix of size M+2L−1. Hence, the size of the matrix to inverse is higher than in the complex case. However, since the matrix to inverse is purely real the associated complexity is lower.

In this prior art solution that has been described above, the interference cancellation filter coefficients and the channel model taps are determined jointly from the training sequence and the received symbols. Because the estimation is performed jointly, the number of quantities to estimate is relatively large.

Figure 3:
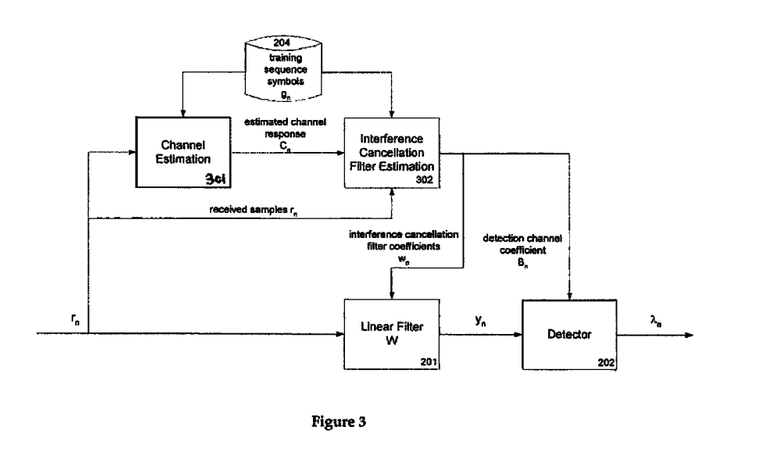
FIG. 3 is a schematic of a receiver according to the present invention.

FIG. 3 illustrates an example of the present invention where the estimation of the propagation channel and of the interference cancellation filter is performed separately. The impulse response $c_n$ of the propagation channel prior to the interference cancellation is first estimated in 301 using the received samples $r_n$ and the training symbols $g_n$ stored in 204. A number of different techniques can be used for the derivation of the channel impulse response and the application of the architecture is not limited to any specific approach. It is for example possible to derive the channel impulse response through cross-correlation between the received samples and the training symbols. The description of a number of possible techniques can be found in "*Channel Estimation in Narrowband Wireless Communication Systems*", H. Arslan and G. E. Bottomley, *Wireless Communications and Mobile Computing*, 2001. The preferred technique is the Least-Square method.

The estimated channel impulse response $c_n$ is then used, alongside the received samples $r_n$ and the training sequence symbols $g_n$, in order to derive the coefficients $w_n$ of the interference cancellation filter. The interference cancellation filter estimation block 302 also provides an estimate for the impulse response $B_n$ of the channel after the interference cancellation filter. The detailed operation of the interference cancellation filter estimation block will be described in a further section.

As in the prior art solution, the received samples are first processed by the interference cancellation filter 201 and the resulting signal is used by the detector 202 to derive estimates of the transmitted information. The difference to the prior-art solution lies in the way the interference cancellation filter coefficients are derived.

The different computations required to derive the coefficients $w_n$ and $B_n$ will now be described. As seen before, the model for the received signal over the training sequence period can be expressed as $$w_0 \times r_n = \sum_{k=0}^{M-1} B_k \times g_{n-k} - \sum_{k=1}^{L-1} w_k \times r_{n-k} + \gamma_n \text{ for } L-1 \le n \le N-1$$

In the prior-art solution, the interference cancellation filter coefficients $w_n$ and the impulse response of the channel after filtering $B_k$ are jointly estimated from the received signal. In the invention, the impulse response $c_n$ of the channel prior to interference cancellation filter is first estimated. It should then be noted that the impulse response $B_k$ of the channel after filter can be derived from the impulse response $c_n$ and the interference cancellation filter coefficients $w_n$. The impulse response $B_k$ can be obtained by convolving the initial channel impulse response $c_n$ with the interference cancellation filter. This relationship can be expressed as follows $$B_k = \sum_{\substack{n=0 \\ P-1 \ge k-n \ge 0}}^{L-1} w_n c_{k-n}$$

The length P of the original channel estimates $c_n$ has been assumed, without any loss of generality, to be larger than or equal to the interference cancellation filter length L. The following relationship between the lengths of the different filters is also met $$L+P-1=M$$

It is possible to replace the model of the final channel impulse response $B_k$ in the model of the received signal in order to obtain $$w_0 \times r_n = \sum_{k=0}^{M-1} \left( \sum_{\substack{n=0 \\ P-1 \geq k-n \geq 0}}^{L-1} w_n c_{k-n} \right) \times g_{n-k} - \sum_{k=1}^{L-1} w_k \times r_{n-k} + \gamma_n$$

The above equation can be modified as follows $$w_0 \times r_n = \sum_{m=0}^{L-1} w_m \left( \sum_{\substack{k=0 \\ P-1 \geq k}}^{M-1-m} c_k \times g_{n-k-m} \right) - \sum_{k=1}^{L-1} w_k \times r_{n-k} + \gamma_n$$

In order to simplify the above equation, it is possible to use the following notation $$\beta_n = \sum_{\substack{k=0 \\ P-1 \geq k}}^{M-1-m} c_k \times g_{n-k}$$

The equation for the received signal can then be expressed as $$w_0 \times r_n = \sum_{m=0}^{L-1} w_m \times \beta_{n-m} - \sum_{k=1}^{L-1} w_k \times r_{n-k} + \gamma_n$$

It should be noted that the quantities $\beta_n$ can be calculated in an efficient manner. They can be obtained by passing the modulated training symbols $g_k$ through the channel impulse response $c_n$.

The previous equation can be modified to obtain $$w_0 \times (r_n - \beta_n) = -\left( \sum_{k=1}^{L-1} w_k \times (r_{n-k} - \beta_{n-k}) \right) + \gamma_n$$

The following notation can be used to simplify the above equation $\xi_n = r_n - \beta_n$ $$w_0 \times \xi_n = -\left( \sum_{k=1}^{L-1} w_k \times \xi_{n-k} \right) + \gamma_n$$

The quantities $\xi_n$ can easily be generated by calculated the complex difference between the received samples $r_n$ and the modulated and filtered training symbols $\beta_n$. It is useful to note that the samples $\xi_n$ are estimates to the noise realisation in the received signal.

As before, we can assume that the first coefficient of the interference cancellation filter is of the form $w_0 = 1 + jw_0^1$ In such a case, the real part of the above equation can be expressed as $$\xi_n^R = -\sum_{m=1}^{L-1} w_m^R \times \xi_{n-m}^R + \sum_{m=0}^{L-1} w_m^I \times \xi_{n-m}^I + \gamma_n^R \text{ for } L-1 \leq n \leq N-1$$

The above equation can then be written in vector format as $$\xi_n^R = \zeta_n \times \Xi + \gamma_n^R \text{ for } L-1 \leq n \leq N-1$$

In this implementation, the real part of the first filter coefficient is assumed to be constant. By making this assumption, it is then possible to implement the derivation of the interference cancellation filter such that only real computations (as opposed to complex) are performed. Such an approach provides two benefits. First, this leads to a reduction in the complexity associated with the derivation of the filter coefficients. Secondly, this approach also provides benefits in terms of error probability performance in cases where the modulation of the signal to recover is real as in the case for the GMSK modulation.

It should be noted that the use of a fixed value for the real part of the first filter coefficient is arbitrary. The method could also apply to the case where the imaginary part rather than the real part is set to a constant value. In fact since it would be possible to apply a rotation to the received signal before filtering, the proposed method will apply to any system where the filter coefficient is fixed in one dimension in the I/Q plane. It is not necessary that the tap for which the 'real' part is fixed to be the first tap in the filter. The proposed method would apply to any filter where the 'real' part of one coefficient is fixed, irrespective of the position of the tap.

The array $\zeta_n$ contains the different estimated noise samples $\zeta_n = (-\xi_{n-1}^R, \ldots, -\xi_{n-L+1}^R, \xi_n^1, \ldots, \xi_{n-L+1}^1)$. The filter coefficient array $\Xi = (w_1^R, \ldots, w_{L-1}^R, w_0^1, \ldots, w_{L-1}^1)^T$ is of size 2L-1.

The set of above equations can then be combined in order to obtain the following matrix equation $$\xi^R = \zeta \times \Xi + \gamma^R$$

The array $\xi^R$ contains the N−L+1 real parts for the error samples corresponding to the training sequence. The matrix $\zeta$ of size (N−L+1)×(2L−1) contains the different noise samples $\xi_n$. The estimated filter coefficient array $\hat{\Xi}$ can then be estimated using the LS method $$\hat{\Xi} = (\zeta^H \times \zeta)^{-1} \times \zeta^H \times \xi^R.$$

Hence, in the architecture, the coefficients of the interference cancellation filter are derived as follows. The channel impulse response $c_n$ is first estimated from the received signal and the known reference symbols. The reference symbols can either correspond to training/pilot symbols or can be generated in a decision-directed manner. The noise samples $\xi_n$ in the received signal are then generated by calculating the difference between the received samples and the reference symbols filtered with the channel impulse response. These noise samples can then be used to derive the coefficients of the interference cancellation filter using the LS technique.

It can be seen from the above equation that the derivation of the filter coefficients requires the inversion of the matrix $\zeta^H \times \zeta$. This matrix is a square matrix of size 2L−1. In the prior-art solution, the matrix to be inverted was of size (M+2L−1) and was therefore larger than that of the interference cancellation receiver of the invention. By reducing the size of the matrix to be inverted, the architecture of the invention leads to a noticeable reduction in the implementation complexity. In typical operation conditions, M can be set equal to 5 and L can be selected to be equal to 3. In these conditions, the approach leads to a 50% reduction in the size of the square matrix to be inverted. The complexity associated with matrix inversion techniques usually increase linearly with the third power of the matrix to inverse ("*Numerical Recipes in C Example Book: The Art of Scientific Computing*"; W. H. Press, B. P. Flannery, S. A. Teukolsky, W T. Vetterling, Cambridge University Press). Hence, the 50% reduction in the size of the matrix to be inverted translates into a 87.5% reduction in the number of computations to be performed.

Following the derivation of the filter coefficients $w_n$, the impulse response $B_n$ of the channel after the interference cancellation filter need to be derived. In one embodiment of the invention, this channel impulse response is derived by simply convolving this initial channel impulse response $c_n$ with the filter coefficients $w_n$.

Figure 4:
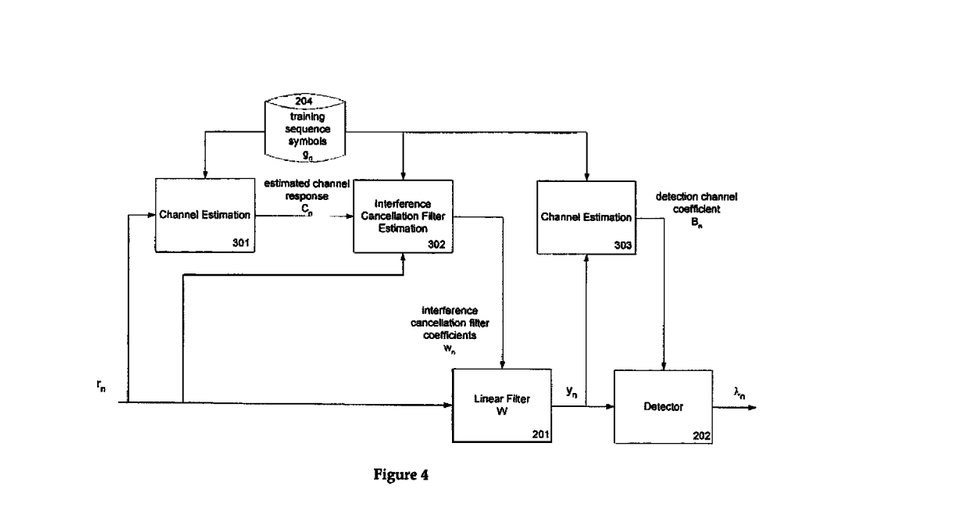
FIG. 4 is a schematic of a receiver according to the present invention.

FIG. 4 presents an alternative embodiment of the invention. It can be seen that this embodiment is very similar to the one described in FIG. 3. However, the set of channel coefficients $B_n$ are generated separately from the interference filter generation in block 303. In this embodiment, the received samples $r_n$ corresponding to the training sequence are first filtered using $w_n$. These filtered samples are then processed in order to derive the estimate channel impulse response. This can be achieved by cross-correlating these samples with the training symbols $g_n$. Alternative methods are described in "*Channel Estimation in Narrowband Wireless Communication Systems*", H. Arslan and G. E. Bottomley, *Wireless Communications and Mobile Computing*, 2001.

It is important to note that even though the receiver architecture has been described for the case of a purely real modulation, it can easily be extended to complex modulation schemes. This can be done in a manner similar to what was done for the prior-art solution. It should also be stressed that the application of the receiver architecture is not limited to the minimisation of the noise in the real part of the received samples. It is possible to minimise the noise in the imaginary part of the received samples. It will be obvious to anyone skilled in the art that the receiver architecture can be implemented to minimise the noise on any single dimension of the two-dimensional I/Q space.

In the above description, a set of training symbols is used for the derivation of the channel impulse response estimates. In digital communication systems, it is common for a training sequence to be transmitted alongside the actual information. The application of the invention is not however limited to such cases. Blocks 301 and 303 can be modified in order to be able to generate channel estimates without the need for a training sequence. Blind channel estimation techniques can be used in order to remove the need for a training sequence to be transmitted. A possible implementation of a blind channel estimation receiver can be found in "*Joint Data and Channel Estimation using Blind Trellis Search Techniques*", N. Seshadri, *IEEE Trans. Commun.* 1994. Alternatively, it would be possible to use eigenvector techniques in order to estimate the propagation channel ("*Is Blind Channel Estimation Feasible in Mobile Communication Systems? A Study Based on GSM*", D. Boss, K.-D. Kammeyer and T. Petermann, *IEEE Journal on Selected Areas in Communications*). When available, the training sequence is also used in order to generate the estimated noise samples. This is achieved by calculating the difference between the received samples and the training symbols passed through the estimated channel impulse response. It is possible to modify the operation of the noise estimation process by using a decision-directed approach. The training symbols can be replaced by estimates of the transmitted information symbols. It should be noted however that the performance of such an approach will usually be lower than that of training sequence based methods.

In the prior-art solution, both the length L of the interference cancellation filter and the number of taps M in the channel impulse response provided to the detector need to be selected before processing of the received signal. In the invention, it is possible to adapt the value L of the filter length to the propagation conditions. The number of taps required in the interference cancellation filter will typically increase as the delay spread of the propagation channel increases. In the invention, the impulse response of the propagation channel is first determined before the filter coefficients are derived. From the estimated impulse response, it is possible to estimate some measure of the channel delay spread. This information can then be used to set the number taps in the interference cancellation coefficients. Doing so can present advantages in terms of computational complexity as it makes it possible to reduce the filter size under favourable conditions. This in turns reduces the complexity of both the matrix inversion used in the filter coefficient derivation as well as the actual filtering of the received samples.

For example, it would be possible to define two different configurations for the length of the interference cancellation filters $L_1$ and $L_2$ where $L_1 > L_2$. The delay spread of the channel can then be calculated and compared against a pre-determined threshold T. If the delay spread of the channel is larger than the threshold T, the number of taps in the interference cancellation filter is selected to be equal to $L_1$. Otherwise, the size of the interference cancellation filter is set equal to $L_2$. It should be noted that the group delay threshold value T could be adapted to the propagation channel conditions. The threshold T could, for example, vary with the SNR in the transmission link.

Alternatively, it would be possible to generate a Look-Up Table (LUT) where different interference cancellation filter size values L are associated with the different values of the metrics characterising the delay-spread of the transmission channel. The LUT can be populated by performing link-level performance simulations in order to find the best filter size for the different values of the selected delay-spread metric.

In the receiver architecture, the interference cancellation filter coefficients are derived using estimates of the noise samples in the received signal. In the two embodiments described above the noise samples are used to generate the matrix $\zeta$ from which the LS solution is derived. In further embodiments of the invention, these noise samples can be used to implement techniques to refine the channel estimation and filter coefficients estimation processes.

For example, it is possible to estimate the power in the real and imaginary components of the received signal $$\begin{cases} \sigma_R^2 = \dfrac{\sum\limits_{n=L-1}^{N-1} (\xi_n^R)^2}{N-L+1} \\ \sigma_I^2 = \dfrac{\sum\limits_{n=L-1}^{N-1} (\xi_n^I)^2}{N-L+1} \end{cases}$$

It is then possible to modify the derivation of the interference cancellation filter coefficients using these noise estimates. It should be stressed that these power estimates include both the power of the thermal noise as well as the interference power. In fact, these terms include any signal which cannot be modelled directly from the estimated channel impulse response.

The estimated noise power values can also be used in order to apply a non-linear scale to the estimated channel taps $c_n$. For example, the SNR for the estimated channel taps can be improved using the following processing $$c'_n = c_n \times \frac{|c_n|^2}{|c_n|^2 + \alpha\sigma^2}$$

This processing can be applied to the P different channel taps. The total noise power $\sigma^2$ is derived by summing the noise power values from both the I and Q branches. The scaling factor $\alpha$ accounts for the reduction in the noise level due to the CIR estimation. It depends on the implemented channel estimation method and can easily be derived from the knowledge of the training symbols. It should be noted that it would be possible to apply different non-linear scaling stages to the estimated channel taps in order to refine their quality. For example, an alternative method would be to set to 0 taps for which the power is less than a given threshold derived from the estimated noise power. It should also be noted that the non-linear scaling stage applied to the estimation of the initial channel taps 301 can also be applied to the second channel estimation stage 303.

The interference channel coefficients can be derived from the estimated noise sample matrix $\zeta$ using the LS method. The implementation of the LS solution does not require any prior knowledge of the noise in the received signal. As indicated before, the receiver generates estimates of the noise samples in order to derive the coefficients of the interference cancellation filter. This information can be used in order to generate a more accurate set of estimates. For example, it is possible to replace the LS solution with a Minimum Mean Square Error (MMSE) implementation ("*Channel Estimation in Narrowband Wireless Communication Systems*", H. Arslan and G. E. Bottomley, *Wireless Communications and Mobile Computing*, 2001). When such a solution is used, the estimated filter coefficient array $\tilde{\Xi}$ can be derived using computations described by the following equation $$\tilde{\Xi} = \zeta^H \times (\zeta\zeta^H + \rho^2 I)^{-1} \times \xi^R$$

The noise term $\rho^2$ is derived from the noise power estimates $\sigma_R^2$ and $\sigma_I^2$. In one implementation of the receiver, the noise term $\rho^2$ is equal to the estimate $\rho_R^2$ of the noise power in the real component of the received samples. The term I represents the identity matrix of size N−L+1. The matrix $(\zeta\zeta^H + \rho^2 I)$ to invert is a square matrix of size N−L+1. Hence, the computational complexity of the MMSE solution is higher than that of the LS solution. However, the noise level in the generated filter coefficients will typically be lower. Hence, it is possible to improve the performance of the receiver by increasing the computational complexity. It should be noted that it would be possible to use the information from the estimated noise samples to implement other techniques for the derivation of the interference cancellation filter coefficients. For example, both Maximum Likelihood Sequence Estimation (MLSE) and the Maximum A Posteriori (MAP) techniques can be used ("*Channel Estimation in Narrowband Wireless Communication Systems*", H. Arslan and G. E. Bottomley, *Wireless Communications and Mobile Computing*, 2001).

In the example given above where the interference cancellation filter coefficients are derived using the MMSE solution, the calculated noise samples are used in order to derive estimates of the noise power. It should be noted however that the noise samples could be used to derive more elaborate metrics. For example, the auto-covariance matrix of the noise could be derived from the sequence of noise samples over the received training sequence. Using these more complex estimates can improve the accuracy of the estimated filter coefficients.

The use of an interference cancellation filter will provide significant performance gains when the accuracy of the detection unit is limited by interference and noise. In conditions where the interference level is very low, the use of the filter 201 does not provide any link-level performance gain. In fact, due to errors in the estimation of the filter coefficients, it is possible that the implementation of the interference cancellation filter degrades the detection performance. Moreover, the use of the interference cancellation filter leads to an increase in the implementation complexity. Hence, in conditions where noise and interference levels are low, it may be beneficial to disable the interference cancellation filter. According to one aspect of the invention, the estimated noise power is used in order to dynamically disable both the interference cancellation filter 201 and the processing associated with the derivation of the coefficients 302. This can be achieved by comparing the estimated noise power to a given threshold. It is possible to use the noise power for the real part $\sigma_R^2$, the noise power for the imaginary part $\sigma_I^2$ or a combination of both. It will be obvious to people skilled in the art that other metrics can be derived from the noise power in order to dynamically configure the receiver. For example, rather than using noise power values, it would be possible to base the decision on the use of the interference cancellation filter based on the Signal to Noise Ratio (SNR). The SNR can be estimated by calculating the ratio of the estimated channel power to the noise power.

The invention claimed is:

1. A method of receiving a signal formed from information bits propagated through a channel, which has been subjected to interference, the method comprising the steps of:
   (a) filtering the received signal with a linear interference cancellation filter using estimated filter coefficients to generate a signal;
   (b) processing the signal in a detection unit using an estimated final impulse response of the channel to generate estimates of the transmitted bits;
   (c) wherein the filter coefficients are calculated using the separate steps of:
      (c1) estimating, using the received signal, an initial impulse response of the propagation channel;
      (c2) deriving, using the estimated initial channel impulse response and the received signal, the filter coefficients,
   wherein a real part of a first filter coefficient of the filter coefficients is constant.

2. A method according to claim 1, wherein the method further comprises the step of:
   (d) estimating, in a separate calculation to the step of calculating the filter coefficients, the final impulse response of the channel.

3. A method according to claim 2, wherein the final impulse response of the channel is estimated by using the estimated channel initial impulse response and the filter coefficients.

4. A method according to claim 3, wherein the final impulse response of the channel is estimated by convolving the initial impulse response with the filter coefficients.

5. A method according to claim 2, wherein the final impulse response of the channel is estimated directly from the signal.

6. A method according to claim 5, wherein a sequence of known modulation symbols is embedded in the transmitted bits and the step of estimating the final impulse response of the channel uses the known modulation symbols.

7. A method according to claim 1, wherein the filter coefficients are derived by the steps of:
- generating estimated samples of noise in the received signal by calculating the difference between received samples and information symbols filtered with the estimated initial channel impulse response;
- deriving the filter coefficients using the generated noise samples.

8. A method according to claim 7, wherein a sequence of known modulation symbols is embedded in the transmitted bits and the information symbols comprise the known modulation symbols.

9. A method according to claim 7, wherein the information symbols comprise estimated modulation symbols generated by using a decision-directed technique.

10. A method according to claim 7, wherein the filter coefficients are derived from the noise samples by using a Least Square (LS) solution.

11. A method according to claim 7, wherein the filter coefficients are derived from the noise samples by using a Minimum Mean Square Error (MMSE) solution.

12. A method according to claim 1, wherein the step of estimating the initial impulse response of the propagation channel also uses a sequence of known modulation symbols transmitted with the propagated signal to estimate the initial impulse response of the propagation channel.

13. A method according to claim 7, further comprising the step of:
- comparing characteristics of the noise samples against a pre-determined template; and
- disabling the linear interference cancellation filter based on the result of the comparison.

14. A method according to claim 13, wherein the step of comparing comprises comparing the power of the noise samples against a threshold; and
- the linear interference cancellation filter is disabled when the power of the noise samples is lower than a threshold.

15. A method according to claim 13, wherein the step of comparing comprises analysing the frequency response of the noise samples.

16. A method according to claim 15, wherein the frequency response of the noise samples is used to identify if the main source of noise is thermal noise, in-band band-limited noise or out-of-band noise.

17. A method according to claim 1, wherein the number of filter coefficients is determined adaptively based on the power delay profile of the initial channel impulse response.

18. A method according to claim 1, wherein one of the estimated filter coefficients is fixed in one dimension in the complex plane.

19. A receiver for receiving a signal formed from information bits propagated through a channel, which has been subjected to interference, the receiver comprising:
- a linear interference cancellation filter arranged to filter the received signal using estimated filter coefficients to generate a signal;
- a detector arranged to process the signal using an estimated final impulse response of the channel to generate estimates of the transmitted bits;
- an initial channel estimation unit arranged to estimate, using the received signal, an initial impulse response of the propagation channel;
- an interference cancellation filter estimation unit, separate to the initial channel estimation unit, and arranged to derive, using the estimated initial channel impulse response and the received signal, the filter coefficients,
- wherein a real part of a first filter coefficient of the filter coefficients is constant.

20. A receiver according to claim 19, further comprising means for estimating, in a separate calculation to the step of calculating the filter coefficients, the final impulse response of the channel.

21. A receiver according to claim 20, wherein the means for estimating the final impulse response of the channel is the interference cancellation filter estimation unit, and the interference cancellation filter estimation unit is arranged to estimate the final impulse response of the channel by using the estimated channel initial impulse response and the filter coefficients.

22. A receiver according to claim 20, wherein the means for estimating the final impulse response of the channel is a final channel estimation unit arranged to estimate the final impulse response of the channel directly from the signal.

23. A cellular telephone handset including a receiver according to claim 19.

* * * * *